(No Model.)

G. W. CRANE.
SWEEP FOR HORSE POWERS.

No. 383,443. Patented May 29, 1888.

Witnesses,
H. J. Beardsley.
J. Jessen.

Inventor,
George. W. Crane.
By his Attorneys,
Paul, Sanford & Merwin.

UNITED STATES PATENT OFFICE.

GEORGE W. CRANE, OF MINNEAPOLIS, MINNESOTA.

SWEEP FOR HORSE-POWERS.

SPECIFICATION forming part of Letters Patent No. 383,443, dated May 29, 1888.

Application filed January 30, 1888. Serial No. 262,305. (No model.)

*To all whom it may concern:*

Be it known that I, GEORGE W. CRANE, of Minneapolis, in the county of Hennepin and State of Minnesota, have invented certain new and useful Improvements in Sweeps for Horse-Powers, of which the following is a specification.

The object of my invention is to provide the sweep or lever for operating the horse-power or pug-mill with a device for equalizing the draft of the horses attached thereto, whereby I am enabled to obtain an even and steady motion of the sweep-head and of the machinery driven thereby.

My invention consists, generally, in the construction and arrangement hereinafter described, and particularly pointed out in the claims.

Figure 1:
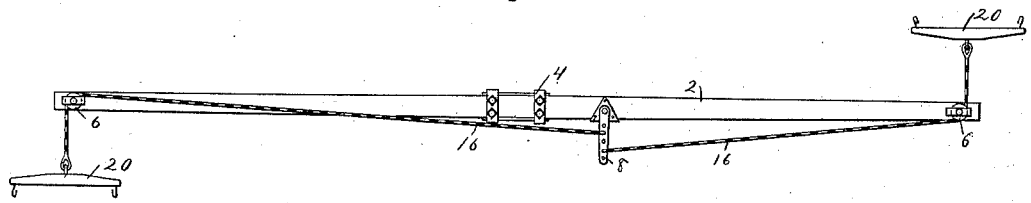
Figure 2:
Figure 3:
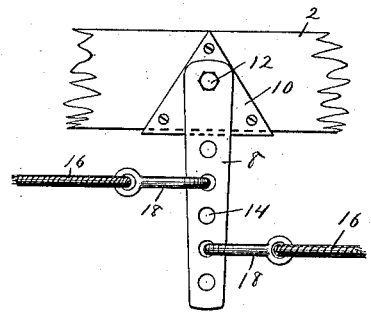

In the drawings which form a part of this specification, Figure 1 is a plan view of a sweep embodying my invention. Fig. 2 is a side elevation of the same. Fig. 3 is a detail, enlarged, showing the equalizing-lever and the manner of attaching the cables.

In devices of this class as heretofore constructed the draft is applied at the ends of the sweep, and where these ends are equidistant from the sweep-head the leverage will be equal, and the power exerted must be equal in order to obtain a steady motion. When the horses are unequally matched in regard to weight and strength, the weaker animal, in order to keep up his end of the lever, will exert his strength with an intermittent or irregular pull, which will cause an unsteady motion to the revolving mechanism.

In some instances a cable has been attached to the whiffletrees and passed over sheaves at the ends of the sweep. This simply allows one horse to pull the other back for a certain distance, but does not overcome the unequal draft.

By my invention I am enabled to overcome entirely the unequal draft and allow for any amount of difference which there may be between the power exerted at the two ends of the sweep.

In the drawings, 2 represents the sweep, which may be of any convenient length, and is attached to a sweep-head, 4, in the usual manner. At or near the outer ends of this sweep I prefer to place sheaves 6, revolving in suitable shroudings, which are bolted or otherwise secured to the sweep. At any convenient point upon the sweep I place the equalizing-lever 8. This lever is pivotally attached to the sweep, preferably by means of a plate, 10, fastened to the body of the sweep, and upon which the lever 8 is secured by the pivot-bolt 12. The lever 8 extends outward from the sweep a suitable distance, and is preferably provided with a series of holes, 14, at intervals of its length, arranged to receive the ends of the ropes or cables 16. These cables are preferably provided with hooks 18, attached thereto and passing through the holes 14, by which means the said cables are secured to the lever, and may be readily changed from one hole to another to allow for any required variation in the leverage. Any other suitable means may be employed to attach the said cable to the lever, whereby the relative positions of the two may be changed with reference to the fulcrum or pivot of said lever. The cables 16 preferably pass from the point of connection with the lever 8 outward in opposite directions to the end of the sweep and around the sheaves 6, and are here attached to the whiffletrees or draft-bars 20. Suitable chains or rods may be substituted in place of the cables 16, if preferred.

The operation of the device is as follows: The two ends of the cables 16 are attached to the lever 8 in such a position as to allow as nearly as possible for the difference in the draft upon the two ends of the sweep. In other words, if it is ascertained that the power applied at one end of the sweep is necessarily in excess of the other, the cable through which this draft is transmitted is attached to the lever near its fulcrum, while the cable from the opposite end is attached at or near the end of the lever. This gives the light draft the long end of the lever and the heavy draft the short end, and the two will be equalized; but the amount which each is capable of exerting will be transmitted to the sweep through the sheaves located at the end of said sweep over which the cables pass.

It will be seen that any unevenness in the draft at the two ends will be equalized by the oscillation of the lever—that is, if the light draft has too much leverage, the lever 8 will be forced about its fulcrum or pivot in the direction of this draft. This operation will draw the two cables nearer in line with each other, and the leverage will be decreased. In this way any slight variations in the draft will equalize themselves, and the power exerted upon the sweep will be even and regular.

I claim as my invention—

1. The combination, with a sweep and the draft chains or cables movably attached to the opposite ends of said sweep, of the equalizing-lever pivoted to the sweep and arranged to receive the ends of said draft-cable at relatively-varying points upon its length, in the manner and for the purpose substantially as described.

2. The combination, with the sweep, of the equalizing-lever 8, pivoted upon said sweep and provided with means for attaching draft chains or cables thereto, and the cables or chains 16, attached to said equalizing lever and extending in opposite directions to the ends of said sweep, substantially as described.

In testimony whereof I have hereunto set my hand this 20th day of January, 1888.

GEO. W. CRANE.

In presence of—
 A. MAY GASKELL,
 R. H. SANFORD.